(12) United States Patent
Lee et al.

(10) Patent No.: US 6,862,053 B2
(45) Date of Patent: Mar. 1, 2005

(54) LIQUID CRYSTAL DISPLAY DEVICE WITH PARTICULAR HOUSING AND FLEXIBLE CIRCUIT

(75) Inventors: Sang-Duk Lee, Gyeonggi-do (KR); Jung-Gug Pae, Gyeonggi-do (KR); Sung-Hwan Cho, Gyeonggi-do (KR); Young-Jae Lee, Gyeonggi-do (KR); Kwang-Soo Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 91 days.

(21) Appl. No.: 09/725,470

(22) Filed: Nov. 30, 2000

(65) Prior Publication Data

US 2001/0002145 A1 May 31, 2001

(30) Foreign Application Priority Data

Nov. 30, 1999 (KR) .................................. P 1999-53932
Jul. 29, 2000 (KR) .................................. P 2000-44106

(51) Int. Cl.$^7$ .......................................... G02F 1/1333
(52) U.S. Cl. ........................................................ 349/58
(58) Field of Search ............................................ 349/58

(56) References Cited

U.S. PATENT DOCUMENTS

| 5,358,412 A | 10/1994 | Maurinus et al. | 439/66 |
| 5,442,470 A | * 8/1995 | Hashimoto | 349/149 |
| 5,656,549 A | 8/1997 | Woosley et al. | 438/118 |
| 5,661,086 A | 8/1997 | Nakashima et al. | 257/668 |
| 5,723,363 A | 3/1998 | Wiese | 437/205 |
| 5,744,084 A | 4/1998 | Chia et al. | 264/276 |
| 5,776,796 A | 7/1998 | Distefano et al. | 438/106 |
| 5,776,798 A | 7/1998 | Quan et al. | 438/112 |
| 5,966,191 A | * 10/1999 | Lee | 349/58 |

* cited by examiner

*Primary Examiner*—Frank G. Font
*Assistant Examiner*—Timothy L Rude
(74) *Attorney, Agent, or Firm*—McGuireWoods LLP

(57) ABSTRACT

A liquid crystal display device in which an integrated printed circuit board is manufactured by integrating a circuit of a gate portion with a source portion and is located on the source side of the liquid crystal panel, and a flexible circuit board according to the COF method is provided on the gate side, and the flexible circuit board is supported towards a mold frame to reduce the area and the volume which is occupied by a portion except for a screen is disclosed. The liquid crystal display device comprises a liquid crystal display panel, an integrated printed circuit board, a flexible circuit board for transferring a gate driving signal and a data driving signal to the liquid crystal display panel, and a mold frame for receiving the liquid crystal display panel and a back light assembly. A support member for supporting the flexible circuit board towards the mold frame is provided on one side of a chassis. Since the gate side flexible circuit board is easily supported by the support member towards the mold frame, the planar area increasing of the liquid crystal display device is prevented.

19 Claims, 13 Drawing Sheets

LIQUID CRYSTAL DISPLAY DEVICE WITH PARTICULAR HOUSING AND FLEXIBLE CIRCUIT

BACKGROUND OF THE INVENTION

1. Field of the Invention

The present invention relates to a liquid crystal display device, and more particularly to a liquid crystal display device which has a structure in which a gate signal is directly applied to a gate line by an integrated printed circuit board without any gate printed circuit board.

2. Description of the Related Art

A liquid crystal display device applies a voltage to a molecular arrangement of a liquid crystal to convert the molecular arrangement to another molecular arrangement. The liquid crystal display device converts the changes of the optical properties of liquid crystal cells which emits light according to the molecular arrangement, and uses the modulation of the light of the liquid crystal cells.

The liquid crystal display device includes a liquid crystal panel to which electrical signal are applied to determine whether the light has been passed. The liquid crystal panel is a passive light device, and a back light assembly for providing the liquid crystal display device with the light is attached to the rear surface of the liquid crystal panel. A source part for applying screen data to display the screen and a gate part for applying gate signals for driving the gate device of a thin film transistor of the liquid crystal panel are attached to the liquid crystal panel. An electrical signal is applied to the liquid crystal of the liquid crystal panel by applying a picture signal to the transistor of the liquid crystal panel through the source part and the gate part, and the light from the back light assembly is regulated to constitute a screen.

The method for connecting the liquid crystal panel to the source and gate driving IC is sorted into a COG (Chip-On Glass) type and a TAB (Tape Automated Bonding) type. According to the COG type, a driving IC of a semiconductor package type is directly mounted to the gate and data areas of the liquid crystal panel, to transfer the electrical signals to the liquid crystal panel. The driving IC uses an anisotropic conductive film, and is bonded to the liquid crystal panel.

According to the TAB type, the liquid crystal panel is directly connected to the printed circuit board by using a tape carrier package to which the driving IC is mounted. One end of the tape carrier package is connected to the liquid crystal panel, and the other end of the tape carrier package is connected to the printed circuit board. Then, the input wire of the carrier package is connected to the output pad of the printed circuit board by soldering or using an anisotropic conductive film.

Examples of the liquid crystal panel modules which use the tape carrier package are disclosed in U.S. Pat. No. 5,572,346 issued to Sakamoto et el. And U.S. Pat. No. 6,061,246 issued to Oh et el. The conventional TFT liquid crystal modules mainly use the tape carrier package to mount the driving IC.

Recently, LCD modules of various structures have been developed to slim the LCD module. Especially, considering the LCD modules are used in portable computers, the light weight of the LCD module is important. If the tape carrier package is applied to the LCD modules, the flexibility is insufficient. Therefore, a flexible circuit board is used in an LCD module. A COF (Chip On Film) method is used to mount the driving IC to the flexible circuit board. According to the COF method, a chip is mounted onto the printed circuit board by using a TAB.

Since the weight and the volume of the liquid crystal device is increased as the size of the screen becomes larger, an effort to reduce the area and the volume which is occupied by a portion except for the screen has been processed. For example, an U.S. patent application Ser. No. 09/551,404 which was filed on Apr. 17, 2000, is pending with USPTO and corresponds to Korean Patent Application No. 99-13650 discloses a liquid crystal display device which removes the gate printed circuit board which increases the thickness of the liquid crystal display panel.

A circuit of the gate portion of the liquid crystal display device is removed to reduce the volume and the weight of the liquid crystal display device. However, since the gate tape carrier package is bent towards the rear surface of the mold frame into which the liquid crystal display panel is received and is attached to the rear surface of the mold frame, the height of the liquid crystal display device is increased according to the position of the driving IC which is mounted to the gate tape carrier package.

SUMMARY OF THE INVENTION

The present invention has been made to solve the above-mentioned problem, and accordingly it is an object of the present invention to provide a liquid crystal display device in which an integrated printed circuit board is manufactured by integrating a circuit of a gate portion with a source portion and is located on the source side of the liquid crystal panel, and a flexible circuit board according to the COF method is provided on the gate side, and the flexible circuit board is supported towards a mold frame to reduce the area and the volume which is occupied by a portion except for a screen.

In order to achieve the above-mentioned object of the present invention, the present invention provides a liquid crystal display device which has a display unit which comprises a liquid crystal display panel, and a flexible circuit board which is attached to one side of the liquid crystal display panel, for transferring driving signals for driving the liquid crystal panel. A back light assembly provides a light to the display unit. A mold frame receives the liquid crystal display panel and the back light assembly. A chassis is coupled to the mold frame and combines the liquid crystal display panel with the backlight assembly. A support means supports the flexible circuit board for transferring the driving signal to the liquid crystal display panel towards the mold frame.

Since the gate side flexible circuit board is easily supported by the support means towards the mold frame, the planar increasing of the liquid crystal display device is prevented.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, preferred embodiments of the present invention will be explained in detail with reference to the attached drawings.

EMBODIMENT 1

Figure 1:
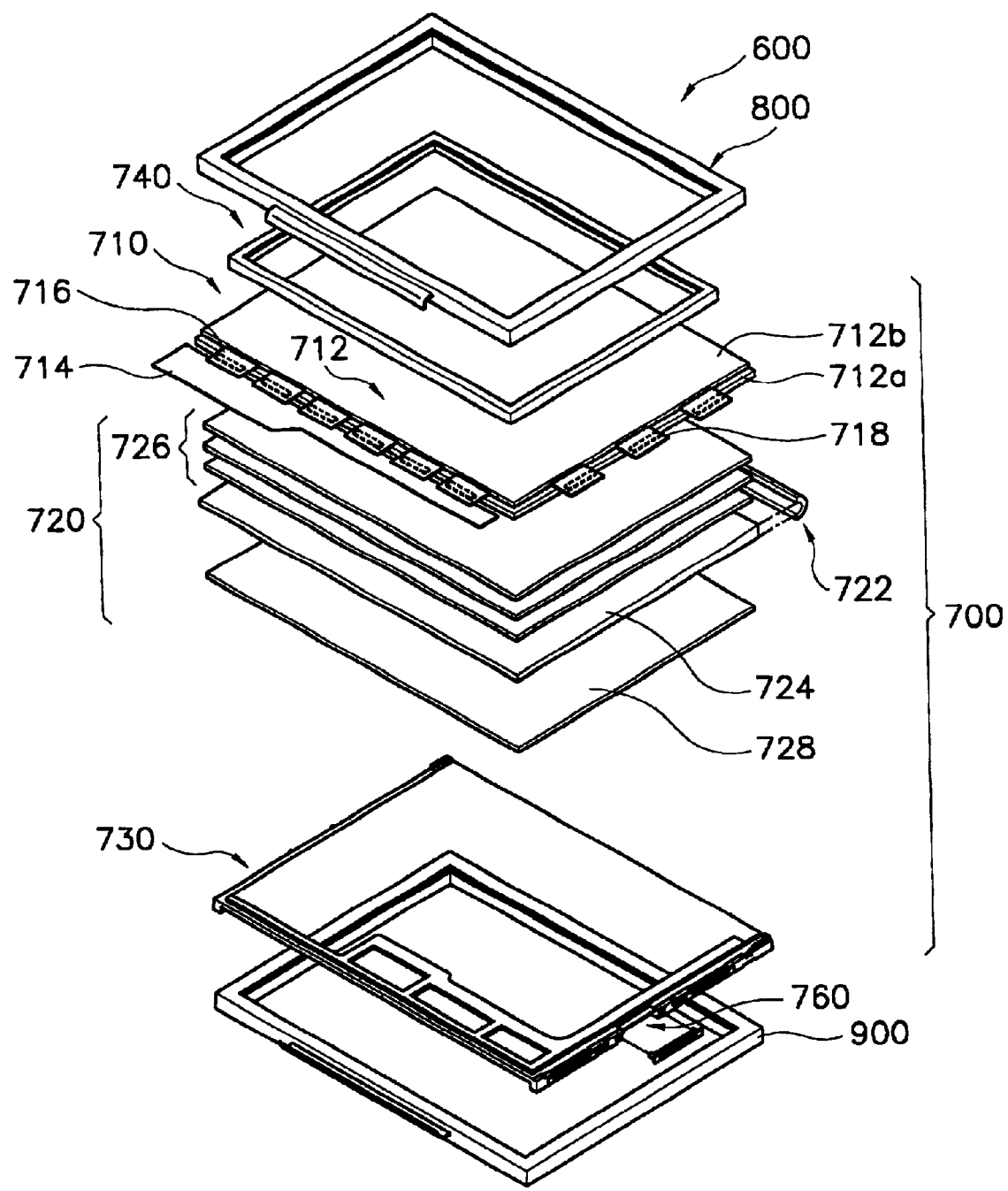
FIG. 1 is an exploded perspective view for showing a liquid crystal display device according to a preferred embodiment of the present invention.

FIG. 1 is an exploded perspective view for schematically showing a liquid crystal display device according to the first preferred embodiment of the present invention.

Referring to FIG. 1, a liquid crystal display device 600 has a liquid crystal display module 700 to which image signals are applied for displaying a screen, a front case 800 for receiving the liquid crystal display module 700, and a rear case 900.

The liquid crystal display module 700 has a display unit 710 which comprises a liquid crystal display panel which displays the screen.

The display unit 710 includes a liquid crystal display panel 712, an integrated printed circuit board 714, and a data side tape carrier package 716, and a gate side flexible circuit board 718 which is manufactured by the COF method.

The liquid crystal display panel 712 includes a thin film transistor substrate 712a, a color filter substrate 712b, and a liquid crystal (not shown).

The thin film transistor substrate 712a is a transparent glass substrate on which thin film transistors of the matrix type are formed. A date line is connected to a source terminal of the thin film transistors, and a gate line is connected to a gate terminal of the thin film transistors. A pixel electrode comprised of indium tin oxide which is a transparent conductive material is formed in a drain terminal.

When electrical signals are inputted to the data line and the gate line, the electrical signals are inputted to the source terminal and the gate terminal of the thin film transistors. The thin film transistors are turned on and off by the electrical signals. Electrical signals which is needed to form pixels are outputted to the drain terminal.

A color filter substrate 712b is opposite to the thin film transistor substrate 172a. The color filter substrate 712b is a substrate in which an RGB pixel which is a color pixel which emits a color when a light passes through it is formed by a thin film process. A common electrode comprised of ITO is coated on the front surface of the color filter substrate 712b.

If an electric power is applied to the gate terminal and the source terminal of the transistor of the thin film transistor substrate 712a and the thin film transistor is turned on, an electric field is formed between the pixel electrode and the common electrode of the color filter substrate. The arranging angle of a liquid crystal which is injected between the thin film transistor substrate 712a and the color filter substrate 714b is changed by the electric field, and the light transmittance rate is changed according to the changed arranging angle, and a desired pixel is obtained.

A driving signal and a timing signal are applied to the gate line and the data line of the thin film transistor to control the arranging angle of the liquid crystal of the liquid crystal display panel 712 and the time at which the liquid crystal is arranged. A data tape carrier package 716 which is a flexible circuit board which determines the time for applying the data driving signal is attached to the source side of the liquid crystal display panel 712, and a gate side flexible circuit board 718 which is manufactured by the COF method for determining the time for applying the driving signal of the gate is attached to the gate side of the liquid crystal display panel 712.

The integrated printed circuit board 714 for receiving image signals from the outside of the liquid crystal display panel 712 and applying driving signals to the gate line and the data line is connected to the data tape carrier package 714 of the data line side of the liquid crystal display panel 712. The integrated printed circuit board 714 includes a source part to which the image signals which are generated at an exterior information processing device (not shown) are applied to provide data driving signals to the liquid crystal display panel 712 and a gate part for providing gate driving signals to the gate line. The integrated printed circuit board 714 generates the gate driving signals for driving the liquid crystal display device, the data signals, and a plurality of timing signals for applying the gate driving signals and the data signals at a proper time. The gate driving signals are applied to the gate line of the liquid crystal display panel 712 through the gate side flexible circuit board 718, and the data signals are applied to the data line of the liquid crystal display panel 712 through the data tape carrier package 716.

A back light assembly 720 for providing a uniform light to the display unit 710 is provided under the display unit 710. The back light assembly 720 comprises a linear lamp 722 for generating a light. The linear lamp 722 is provided on one side of the liquid crystal display module 700. A light guide plate 724 has a size which corresponds to the liquid crystal panel 712 of the display unit 710. The light guide plate 724 is located under the liquid crystal panel 712, and a portion which is near the lamp 722 is the most thickest, and the portions which are far from the lamp 722 are thinner (that is, the thickness of the light guide plate 724 gradually decreases as the distance from the lamp 722 increases). The light guide plate 724 guides the light generated in the lamp 722 towards the display unit 710, and changes the passage of the light.

A plurality of optical sheets 726 for making the luminosity of the light which is emitted from the light guide plate 724 and is inputted to the liquid crystal display panel 712 uniform are provided above the light guide plate 724. A refection plate 728 for reflecting the light which is leaked from the light guide plate 724 towards the light guide plate 724 to increase the efficiency of the light is provided under the light guide plate 724.

The display unit 710 and the back light assembly 720 is supported by a mold frame 730 which is a receiving receptacle. The mold frame 730 has a box-shape, and the upper portion of the mold frame is opened. Namely, the mold frame 730 has four side walls and a bottom surface. The integrated printed circuit board 714 is bent along the outer side surface of the mold frame, and openings for positioning the bent portion of the integrated printed circuit board 714 are formed at the bottom surface of the mold frame 730.

The integrated printed circuit board 714 of the display unit 710 and the gate tape carrier package 718 is bent to the outside of the mold frame 730, and a chassis 740 which is coupled to the mold frame is provided to fix the liquid crystal display panel 712 to the backlight assembly 720.

The chassis 740 has a rectangular shape like the mold frame 730. The upper portion of the chassis 740 is opened to expose the liquid crystal panel 710, and the side wall portion of the chassis 740 is bent to the inner vertical direction to cover the peripheral portion of the upper surface of the liquid crystal panel 710.

The liquid crystal display device includes a support member for supporting the flexible circuit board for transmitting the driving signal to the liquid crystal panel toward the mold frame. In case the flexible circuit board 718 is bent towards the side wall of the mold frame 730, the support member prevents the end portion of the flexible circuit board 718 from protruding towards the bottom surface of the mold frame 730 and prevents the increasing of the planar area of the liquid crystal display device 600 by the gage driving IC which is formed in the flexible circuit board 718.

Figure 2:
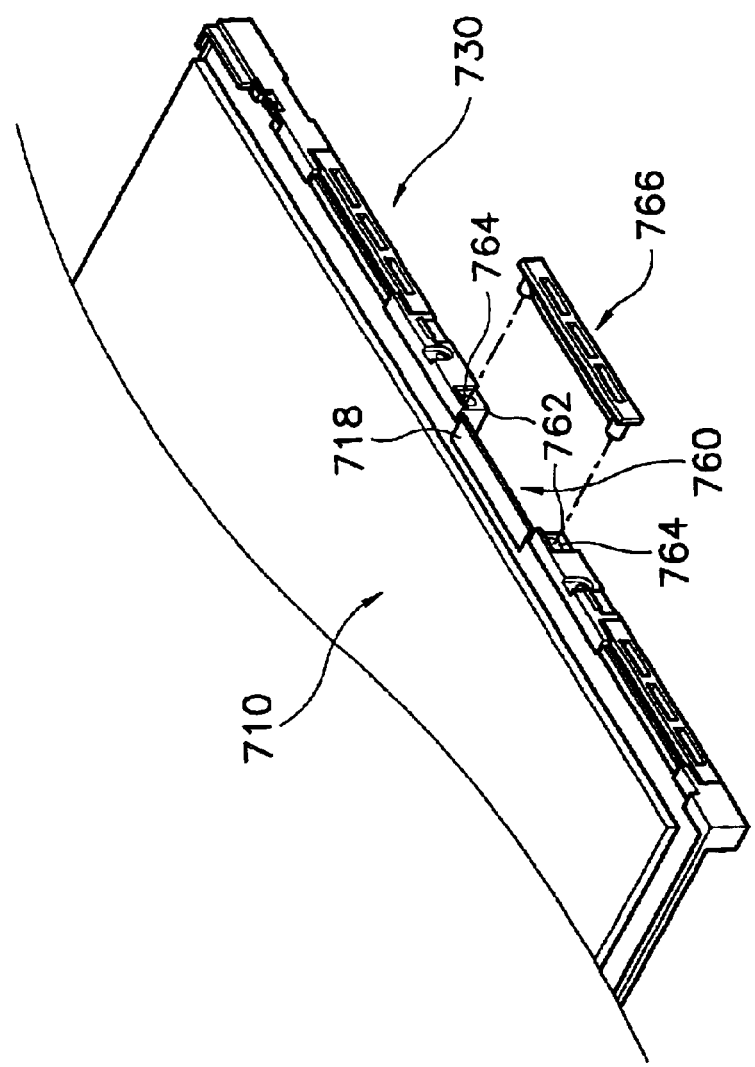
FIG. 2 is a perspective view for showing the engaging state of a flexible circuit board separating support member of a mold frame according to the present invention.
Figure 3:
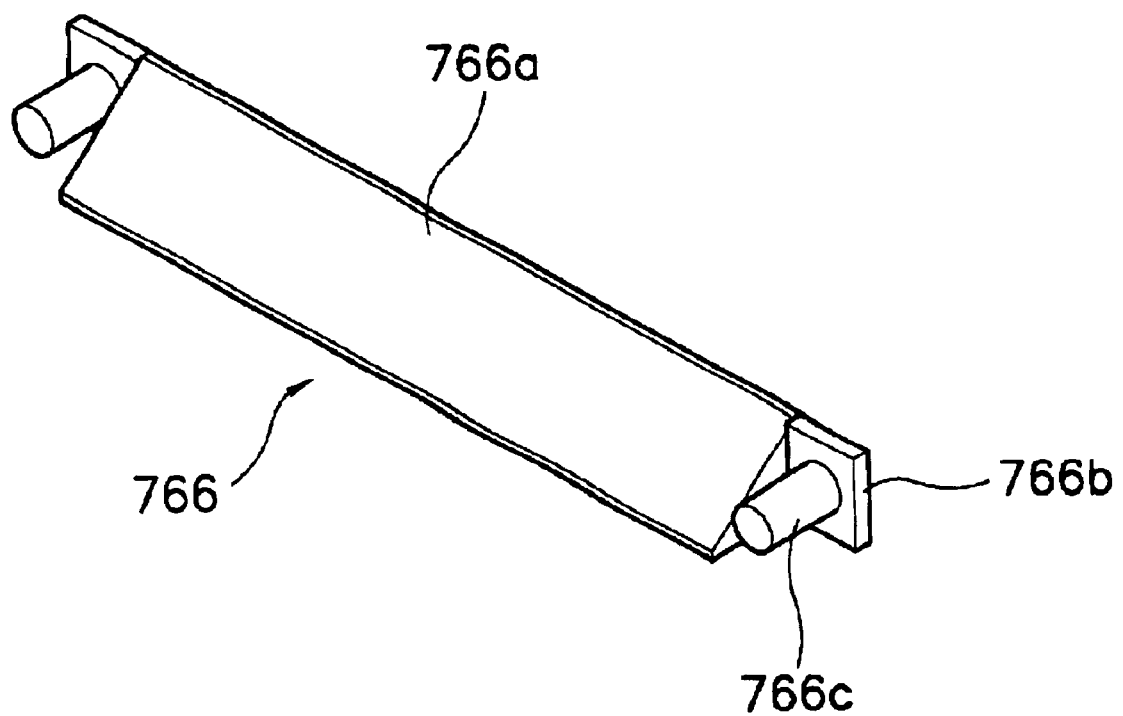
FIG. 3 is a perspective view for showing of a flexible circuit board separating support member according to the present invention.
Figure 4:
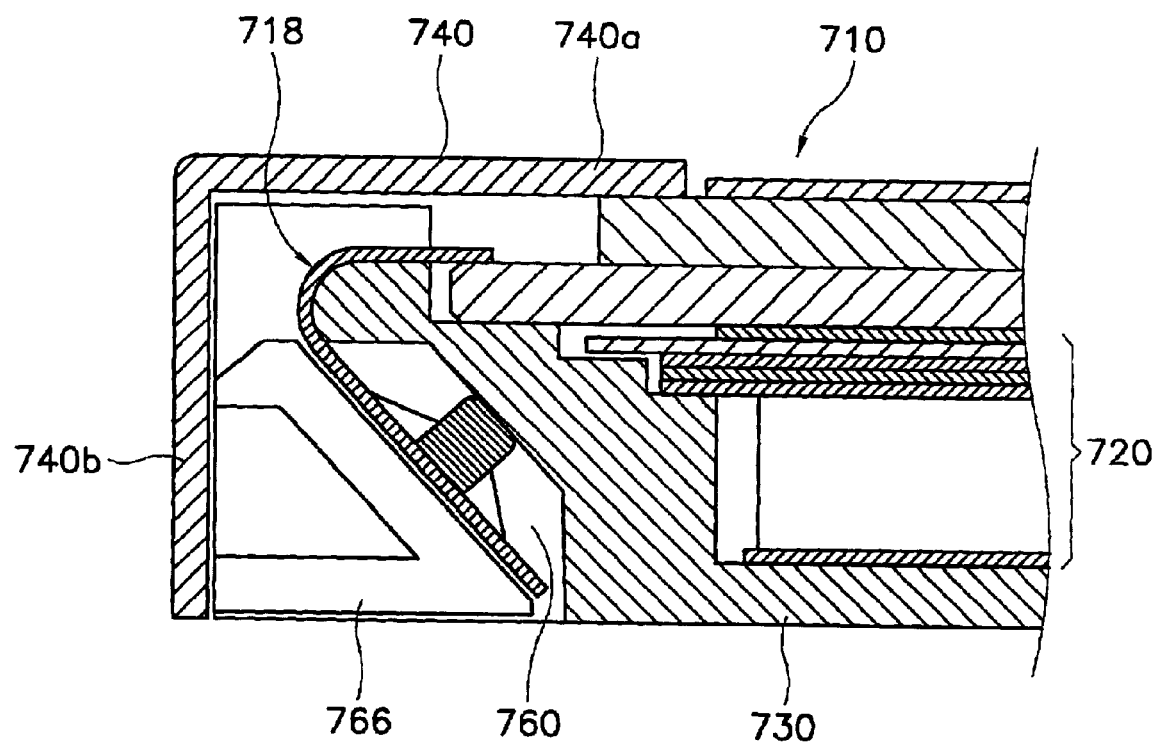
FIG. 4 is a cross-sectional view for showing the separating support member of FIG. 3 which is adhered to a flexible circuit board.

FIG. 2 is a perspective view for showing the engagement of a gate side flexible circuit board separating support member 766 and the mold frame 730, and FIG. 3 is a perspective view for showing the gate side flexible circuit board separating support member 766, and FIG. 4 is a cross-sectional view for showing the separating support member 766 which is adhered to the gate side flexible circuit board 718.

Referring to FIGS. 1 and 2, the mold frame 730 according to the preferred embodiment of the present invention is bent along the side wall of the gate side flexible circuit board 718, and includes a receiving recess 760 at a portion in which the gate driving IC makes contact with the side wall. In case the gate side flexible circuit board 718 is bent towards the side wall of the mold frame 730, the receiving recess 760 prevents the end thereof from protruding from the side wall of the mold frame 730. The mold frame 730 is inclined from the upper portion of the outer side surface thereof towards the lower end of the outer side surface. A portion of the receiving recess 760 which makes contact with the gate driving IC is formed deep to receiving the protruding portion. Specifically, a central portion of the receiving recess 760 is formed deep by the height of the gate driving IC to receive the gate driving IC.

The inclined receiving recess 760 prevents the end portion of the gate side flexible circuit board 718 from protruding towards the outside of the mold frame 730, and restrains the increasing of the thickness of the liquid crystal display device 600 by the gate driving IC.

As shown in FIG. 2, an engaging recess 760 having a predetermined depth is formed on both sides of the inclined receiving recess 760 formed in the mold frame 730, and an engaging hole 764 having a predetermined depth is formed on the bottom surface of the engaging recess 762. Also, the separating support member 766 for restricting the movement of the position of the gate side flexible circuit board 718 is installed.

The preferred embodiment of the separating supporting member 766 is more specifically shown in FIGS. 2 and 3. The separating support member 766 comprises a body 766a of a triangular prism which has a length of the inclined surface which corresponds to the length of the inclined surface of the receiving recess 760, an engaging plate 766b which is formed at the end portion of the body 766a and adheres to the engaging recess 762, and an engaging boss 766c which is formed in the engaging plate 766b and is engaged corresponding to the engaging hole 764. The rest portions except for the inclined surface of the separating support member 766 has a recess of a predetermined depth, and thus the weight of the separating support member 766 is minimized.

As shown in FIG. 4, the inclined surface of the separating support member 766 closely supports the bottom surface of the gate side flexible circuit board 718 which is bent towards the outside of the side wall of the mold frame 730, and the gate side flexible circuit board 718 is placed into the receiving recess 760 of the mold frame 730.

After the gate side flexible circuit board 718 is fixed to the mold frame 730, the chassis 740 is engaged with the outer side of the side wall of the mold frame 730 to prevent the separating support member 766 and the display unit 710 from deviating from the mold frame 730. The chassis 740 has an L-shaped clamp like cross-section. The chassis 740 is formed by integrally engaging a horizontal portion 740a which presses the peripheral portion of the upper surface of the display unit 710 in a state in which the display area of the display unit 710 is opened and a side wall portion 740b which engages the separating support member 766 and the mold frame 730 by engaging with the side wall of the mold frame 730 and pressing the rear surface of the separating support member 766. The liquid crystal display module 700 is mounted to the front case 800 and the rear surface case 900 to form the liquid crystal display device 600.

In order to assemble the liquid crystal display device, the back light assembly 720 is positioned in the mold frame 730, and then the display unit 710 is positioned on the back light assembly 720. Then, the integrated printed circuit board 714 which is connected through the data tape carrier package 716 is bent along the outer side surface of the side wall of the mold frame 730, and is positioned in the opening potion formed in the bottom surface of the mold frame 730. Then, the chassis 740 is engaged with the mold frame 730 to fix the display unit 710 and the back light assembly 720 to the mold frame 730. Then, the gate side flexible circuit board 718 attached to the gate side of the display unit surrounds the outer side surface of the mold frame, and is bent to be fixed to the bottom surface of the mold frame 730.

EMBODIMENT 2

Figure 5:
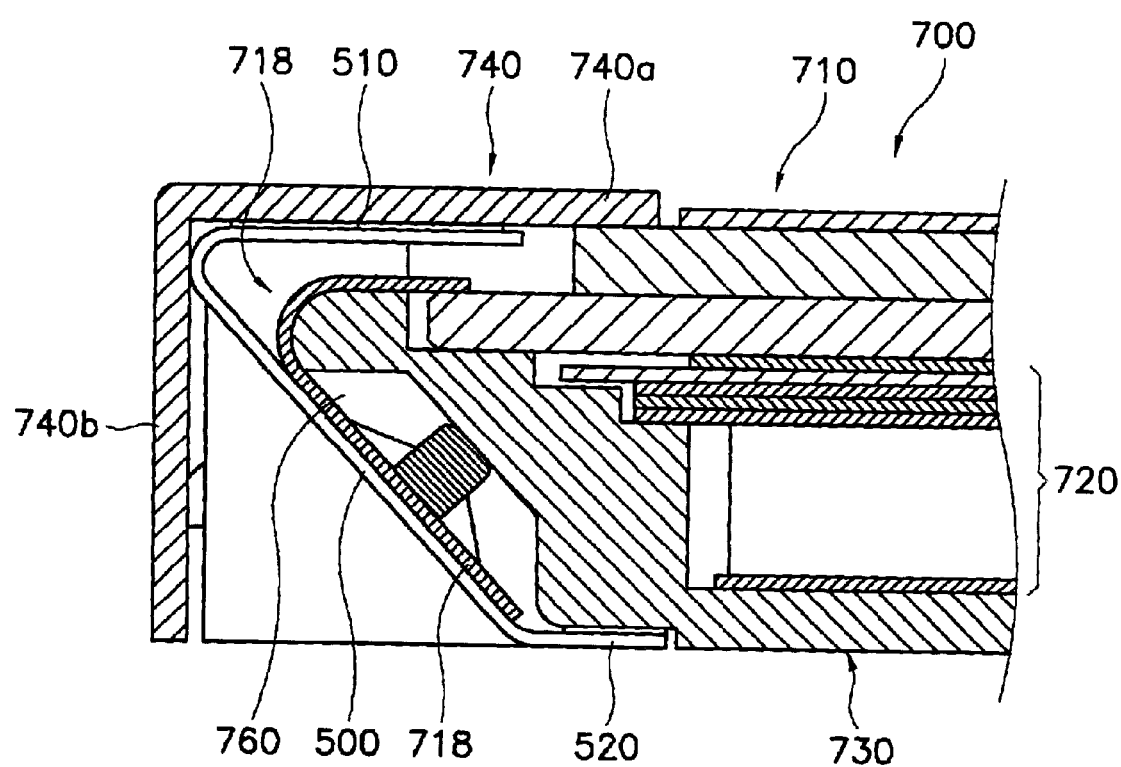
FIG. 5 is a cross-sectional view for showing the engaging state of the flexible circuit board according to the second preferred embodiment of the present invention and a mold frame.
Figure 6:
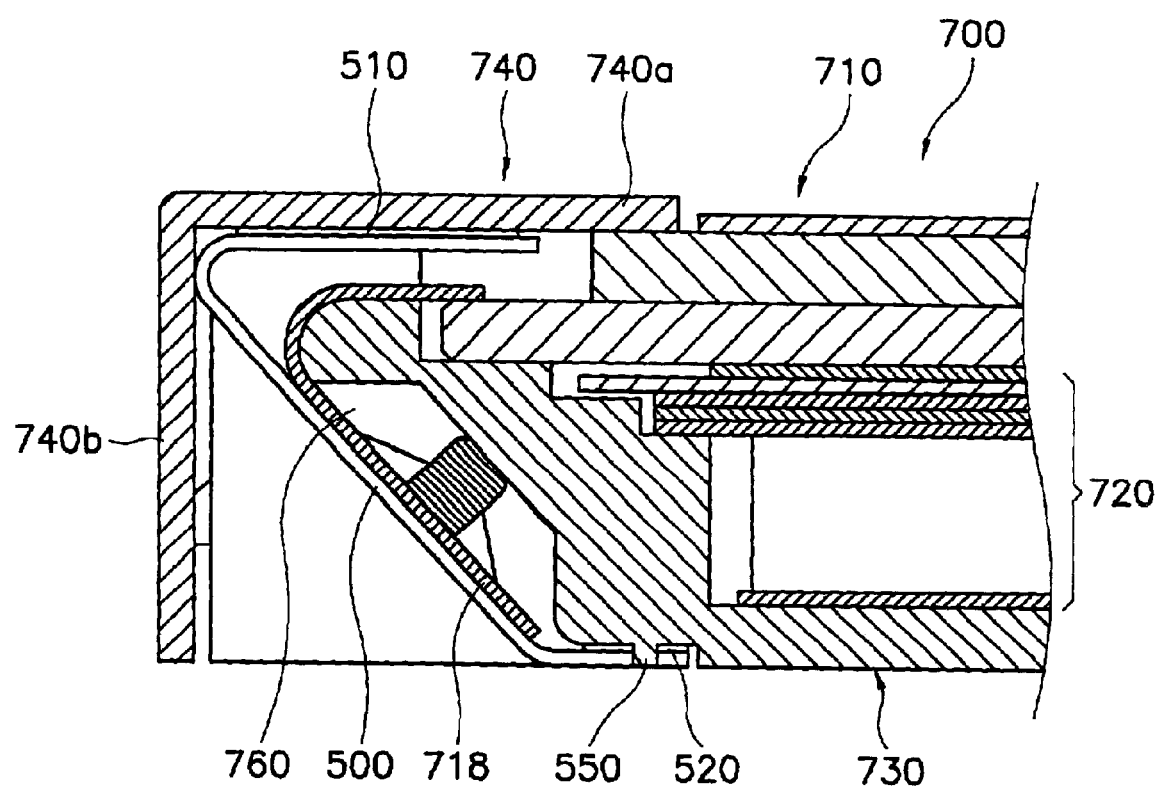
FIG. 6 is a cross-sectional view for showing the engaging state of a fixing film of FIG. 5 in case a catching boss is provided on the bottom surface of a mold frame.
Figure 7:
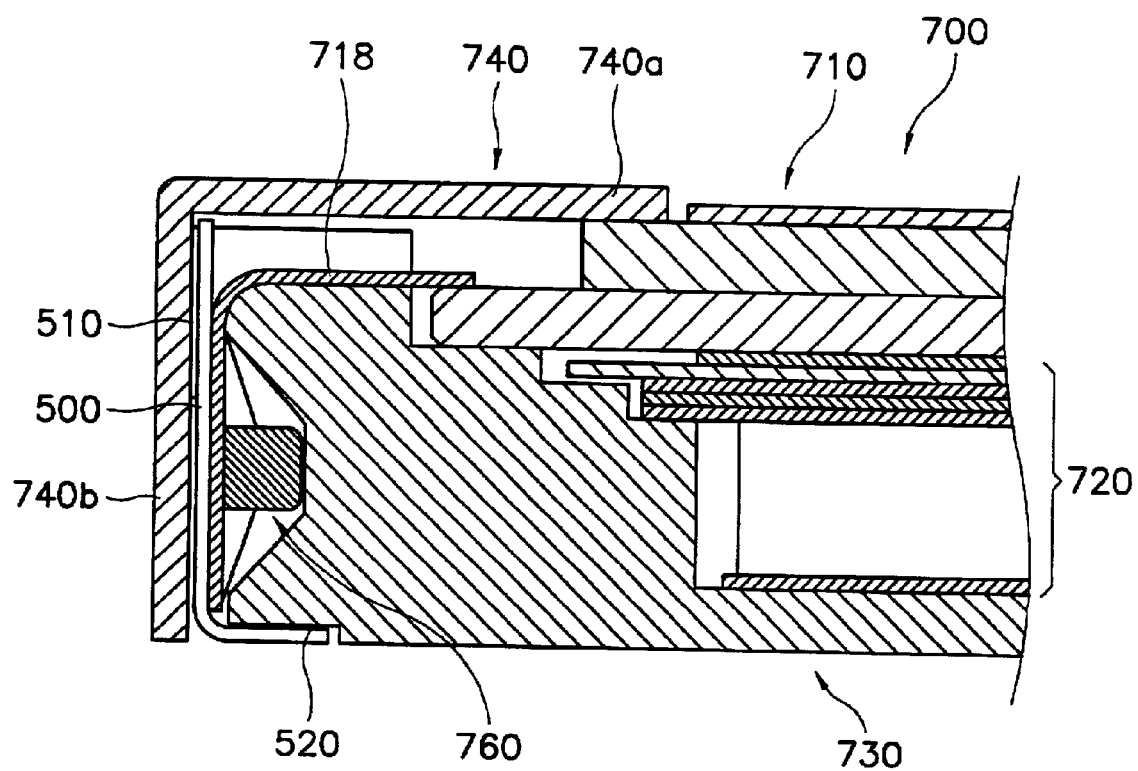
FIG. 7 is a cross-sectional view for showing the engagement of the fixing film of FIG. 5 in case the length of the bent flexible circuit board is shorter than the length of the side wall of the mold frame.
Figure 8:
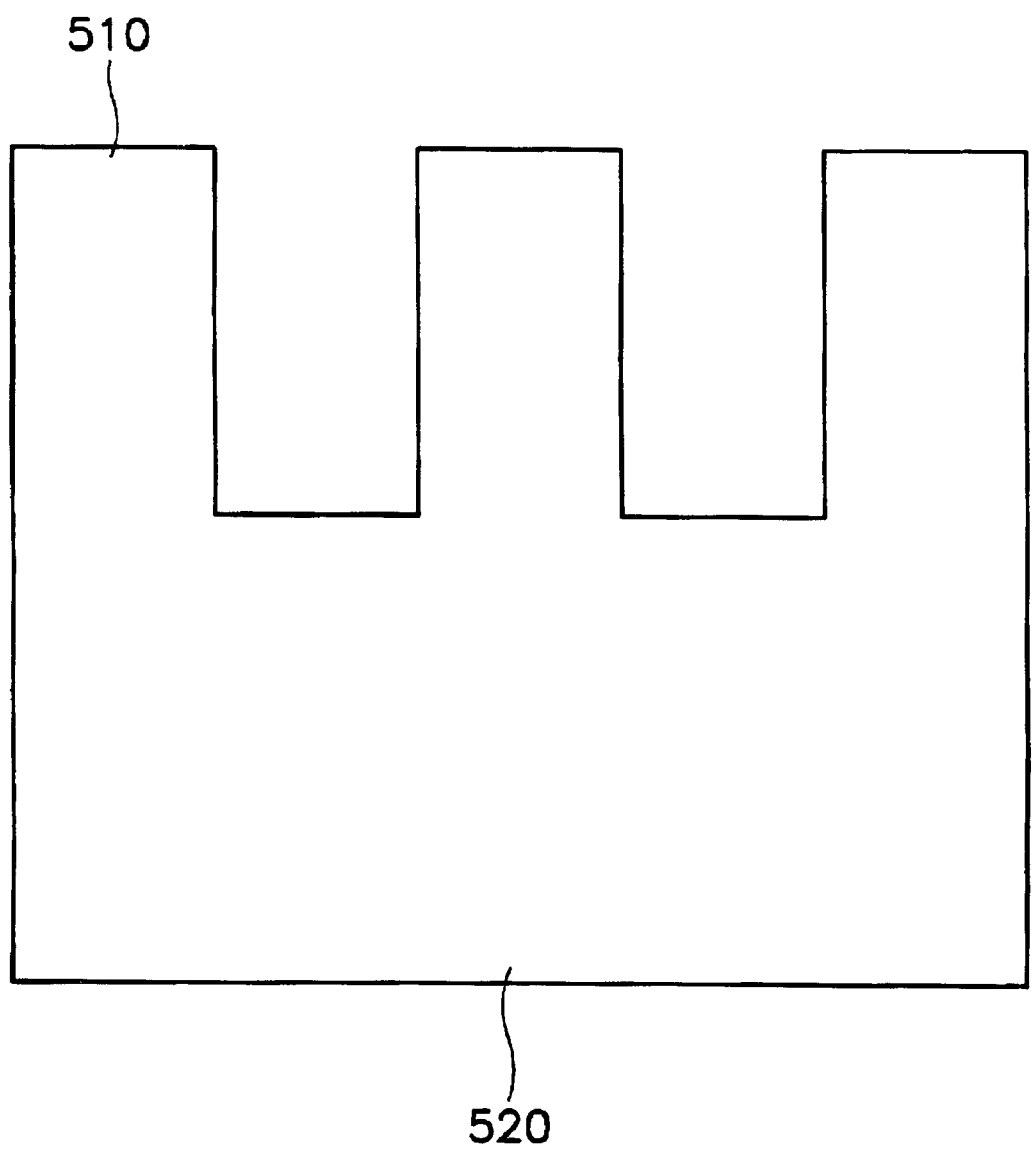
FIG. 8 is a preferred embodiment of a fixing film in which the number of the end portions attached to a chassis is identical with the number of receiving recesses.

FIG. 5 is a cross-sectional view for showing the engaging state of a gate side flexible circuit board and a mold frame according to the second preferred embodiment of the present invention. FIG. 6 is a cross-sectional view for showing the engagement according to the second preferred embodiment of the present invention of the case in which a catching boss is formed on the bottom surface of the mold frame 730. FIG. 7 is a cross-sectional view for showing the engagement of the mold frame according to the preferred embodiment of the present invention of the case in which the length of the bent flexible circuit board is shorter than the length of the side wall of the mold frame. FIG. 8 is a preferred embodiment of a fixing film which is disclosed in FIGS. 5 to 8, and the number of the end portions attached to a chassis is identical with the number of receiving recesses.

In the preferred embodiment, a flexible circuit board fixing film 500 is used as a support member instead of the separating support member of the first preferred embodiment.

Referring to FIG. 5, the gate side flexible circuit board 718 is bent towards the side wall of the mold frame 730, and a portion of the fixing film 500 which is longer than the width of the receiving recess 760 and the length of the gate side flexible circuit board 718 is attached to the inner side surface of the horizontal portion 740 of the chassis 740 by a bonding material or a bonding tape.

In the state in which one side end portion of the fixing film 500 is attached to the inner side surface of the chassis, the other end portion of the fixing film 500 is pulled tight and surrounds the gate side flexible circuit board 718. The fixing film 500 is fixed to the bottom surface of the outer side of the mold frame, pressing the flexible circuit board 718 towards the inner side of the receiving recess. Then, a bonding material 520 can be used to fix the fixing film 500 to the bottom surface of the mold frame 730. A double sided bonding tape can be used instead of the bonding material 520.

As shown in FIG. 6, the fixing film 500 is fixed by forming a penetrating hole in the fixing film 500 which is opposite to the bottom surface of the mold frame 730 and forming a catching boss 550 which is engaged with the penetrating hole in the mold frame 730. It is preferable that a bonding material 520 or a bonding tape is formed in the fixing film 500 which is opposite to the bottom surface of the mold frame 730.

Referring to FIG. 7, the gate driving IC is received in the receiving recess 760, and one end portion of the fixing film 500 is tightly fixed to the inner surface of the vertical portion 740b of the chassis 740, and the fixing film 500 is fixed to the mold frame 730 with the other end of the fixing film 500 tightly pulled.

FIGS. 5 to 7 show a preferred embodiment in which the gate side flexible circuit board 718 is fixed by using the fixing film 500 which corresponds to the number of the receiving recess 760. One end of the fixing film 500 can be mutually connected in the state in which the other end of the fixing film 500 corresponds to the number of the receiving recess 760, and the fixing film 500 can be attached to the bottom surface of the mold frame 730 by one process. FIG. 8 is a top view for showing a preferred embodiment of the fixing film 500 to which an end portion which is attached to the mold frame 730 is integrally connected.

Referring to FIG. 8, an uneven portion 510 of the fixing film 500 is divided corresponding to the receiving recess 760, the gate side flexible circuit board 718 is supported towards the inner side of the receiving recess. The lower end portion 520 of the fixing film 500 is integrally formed, and can be attached to the bottom portion of the mold frame 730.

EMBODIMENT 3

Figure 9:
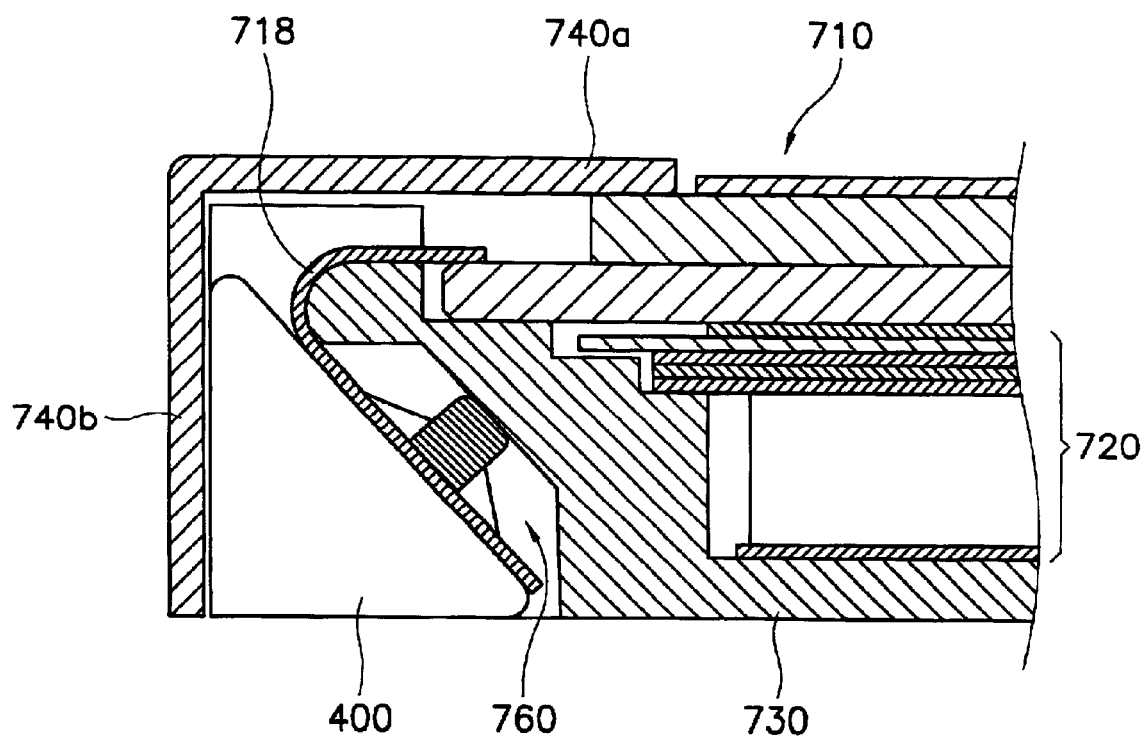
FIG. 9 is a cross-sectional view for showing the engaging state of a resilient member which is located in a space between the bottom surface of a flexible circuit board and the inner side surface of a chassis.

FIG. 9 is a cross-sectional view for showing the engaging state in which the flexible circuit board is engaged with the mold frame by a resilient member which is inserted into a space which is formed between the bottom surface of the flexible circuit board and the inner side surface of the chassis.

According to the preferred embodiment, the resilient member 400 of a triangular prism is inserted into the space which is formed between the bottom surface of the gate side flexible circuit board 718 and the inner side surface of the vertical portion 740b of the chassis 740 by the tight fitting to tightly fix the gate side flexible circuit board 718 to the receiving recess 760 of the mold frame 730.

EMBODIMENT 4

Figure 10:
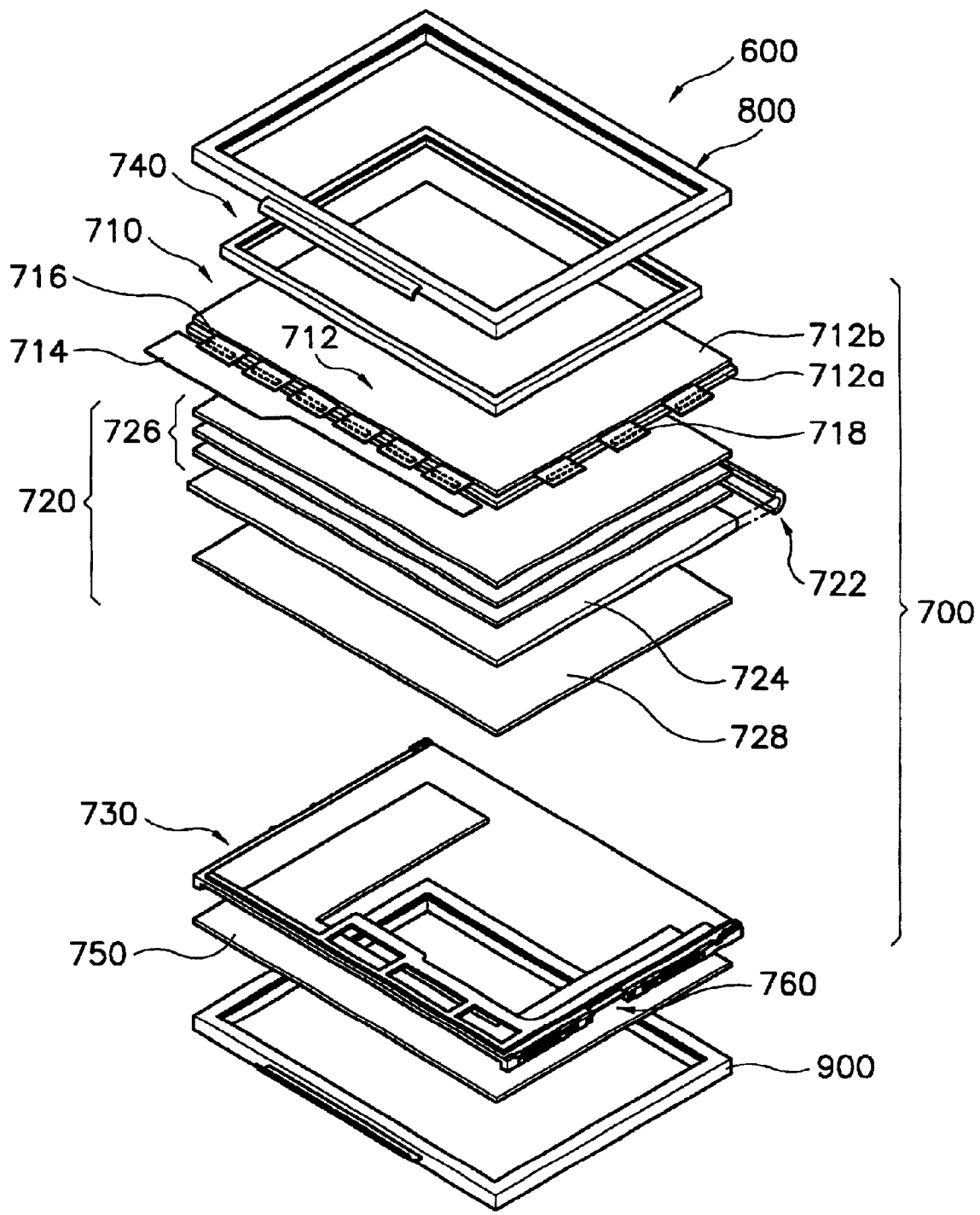
FIG. 10 is an exploded perspective view for showing a liquid crystal display device including a printed circuit board cover.
Figure 11:
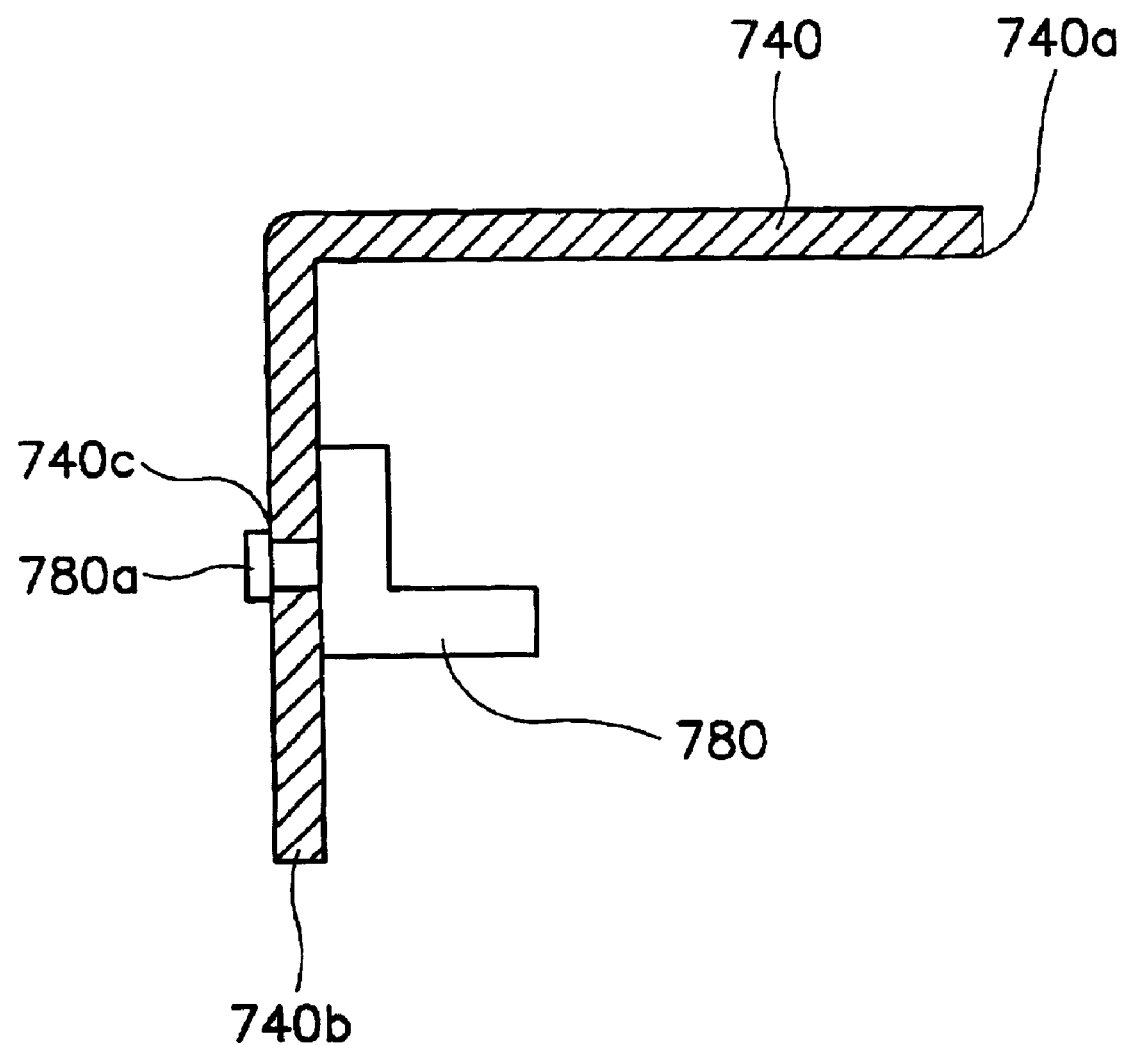
FIG. 11 is a cross-sectional view for showing a chassis of a portion which corresponds to a portion in which a flexible circuit board is formed.
Figure 12:
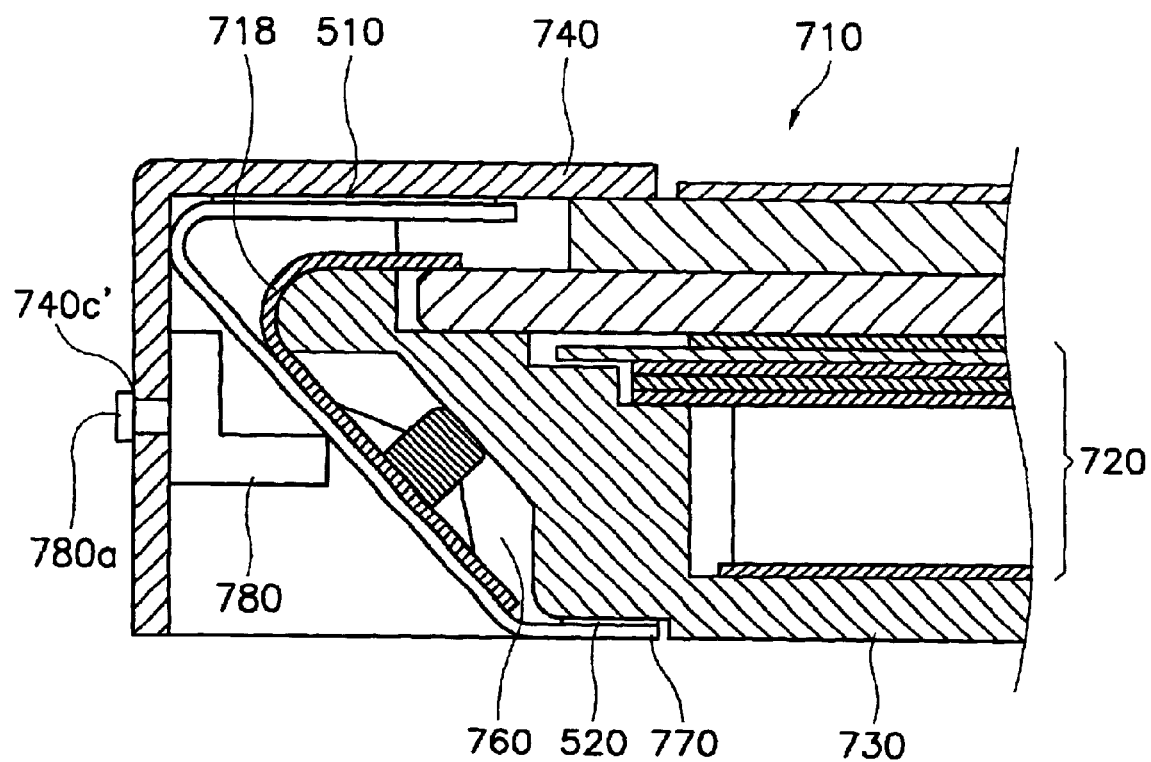
FIG. 12 is a cross-sectional view for showing a flexible circuit board portion of a liquid crystal display device which is assembled by using the chassis of FIG. 10.

FIG. 10 is an exploded perspective view for showing a liquid crystal display device which includes a printed circuit board cover according to the preferred embodiment. FIG. 11 is a cross-sectional view for showing the chassis of the portion which corresponds to a portion in which the gate side flexible circuit board is formed. FIG. 12 is a cross-sectional view for showing a gate side flexible circuit board portion of the liquid crystal display device which is assembled by using the chassis which is shown in FIG. 11.

According to the preferred embodiment, a support member for positioning the gate side flexible circuit board 718 which is bent along the side wall of the mold frame in the receiving recess 760 is provided to the chassis.

Referring to FIG. 10, a printed circuit board cover 750 is provided under the mold frame. The printed circuit board cover 750 is provided to protect the bottom portion of the data side to which the integrated printed circuit board 714 is attached and the gate side bottom portion to which the gate side flexible circuit board 718 is fixed. The printed circuit board cover 750 can be manufactured by using a plastic film. The other members are identical as in the first preferred embodiment, and the explanation thereof is omitted.

Referring to FIG. 11, a resilient (or elastic) support member 780 for supporting the gate side flexible circuit board 718 to the mold frame 730 is provided on the inner surface of the side wall portion 740b of the chassis 740 which corresponds to the forming portion of the gate side flexible circuit board 718.

It is preferable that the resilient support member 780 is made of a resilient material such as a rubber. Preferably, the surface of the resilient support member 780 is smoothly processed to prevent the damage of the gate side flexible circuit board 718. The resilient support member 780 has an L-shape, and the vertical portion of the resilient support member 780 is fixed to the inner surface of a vertical portion 740b of the chassis 740, and the horizontal portion of the resilient support member 780 resiliently supports the gate side flexible circuit board 718. An opening portion 740c is formed in the vertical portion 740b of the chassis 740 to fix the vertical portion of the resilient support member 780. A resilient fixing boss 760a which is inserted into the opening portion 740c is formed in the vertical portion of the resilient support member 760.

The vertical portion of the support member 760 can be attached to the inner side surface of the side wall portion 740b of the chassis 740 by using a double sided bonding tape instead of the opening portion 740c and the resilient fixing boss 760a.

As shown in FIG. 12, the back light assembly 720 is positioned in the mold frame 730, and the display unit 710 is positioned on the back light assembly 720. The end of the horizontal portion 740a of the chassis 740 is positioned along the peripheral portion of the display unit 710. The gate side flexible circuit board 718 which is attached to the gate side of the display unit 710 is folded to surround the outer side surface of the mold frame 730. A receiving recess 760 for receiving the chip of the gate side flexible circuit board 718 is formed in the outer side wall portion of the mold frame 730. In the assembled state, the horizontal portion of the support member 780 supports the gate side flexible circuit board 718 so that the gate side flexible circuit board 718 is adhered to the mold frame 730.

A protecting cover 770 for covering the gate side flexible circuit board 718 is provided between the gate side flexible circuit board 718 and the support member 780 to prevent the damage of the gate side flexible circuit board 718. The protecting cover 770 is foxed to the inner surface portion of the side wall 740b of the chassis 740 which is located above the support member 760, and the upper portion of the protecting cover 770 is fixed to the bottom surface of the horizontal portion 740a of the chassis 740. A bonding material 510 or a bonding tape can be used to fix the upper end of the protecting cover 770 to the bottom surface of the horizontal portion 740a of the chassis 740. The middle portion of the protecting cover 770 is surrounded to protect the gate side flexible circuit board 718. The lower end of the protecting cover 770 is fixed to the gate end of the bottom surface portion of the mold frame 730. A bonding material or a bonding tape can be used as the fixing member for fixing the lower end of the protecting cover 770.

EMBODIMENT 5

Figure 13:
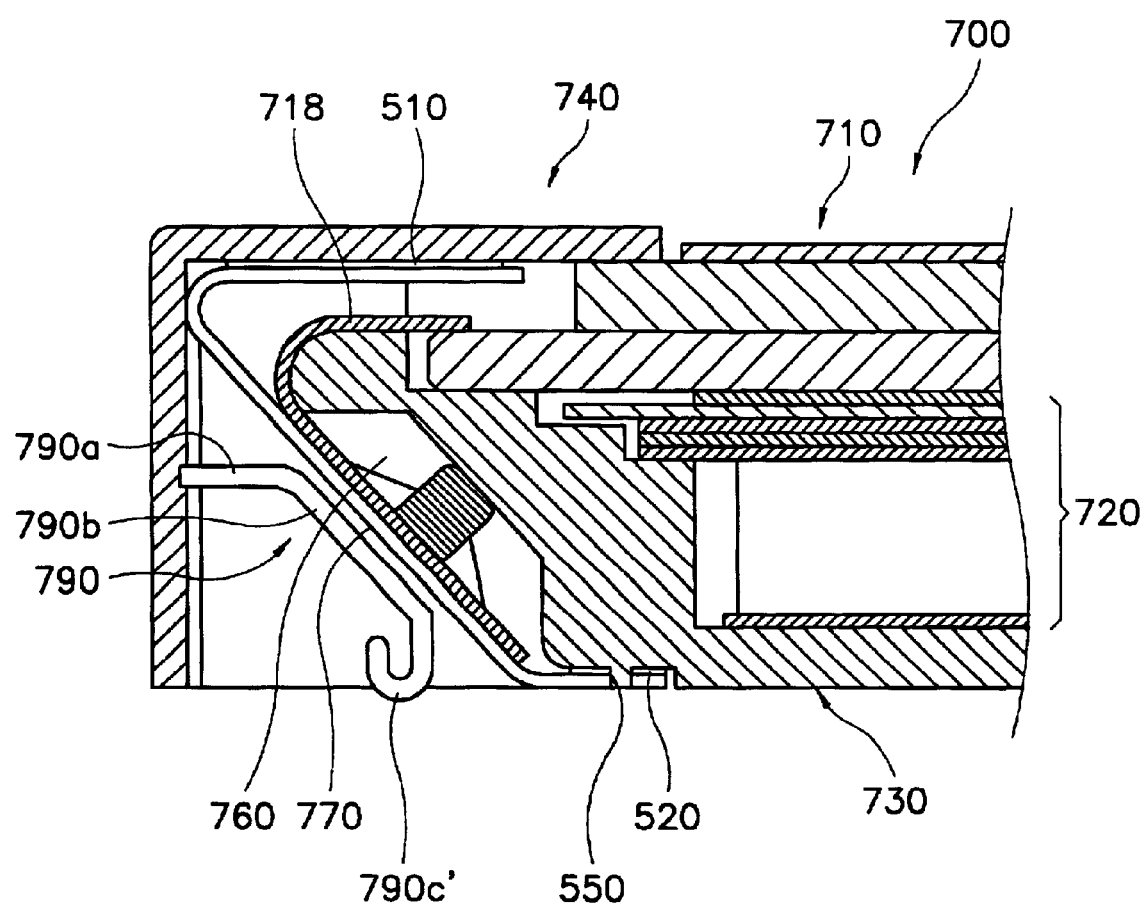
FIG. 13 is a cross-sectional view for showing a state in which a flexible circuit board is supported towards the mold frame according to a preferred embodiment of the present invention.

FIG. 13 is a cross-sectional view for showing the state in which a flexible circuit board is fixed to a mold frame according to the preferred embodiment.

Referring to FIG. 13, the gate side flexible circuit board 718 is supported by using a bending piece 790 which is extended from the vertical portion 740b of the chassis 740 instead of the resilient support member 780 of FIG. 11. The bending portion 790 is extended from the vertical portion 740b of the chassis 740 which corresponds to a portion to which the gate side flexible circuit board 718 is attached. The bending piece 790 has a horizontal portion 790a which is fixed in the vicinity of the central portion of the side wall portion 740b of the chassis 740. An inclined portion 790b for resiliently supporting the gate side flexible circuit board 718 is extended at the end of the horizontal portion 790a. A support portion 790c which provides a resilient force to the inclined portion 790b is formed at the lower end of the inclined portion 790b. The support portion 790c is extended to the bottom surface of the mold frame 730 and supports the bending piece 790. The support portion 745 has a hook shape, but can have a ring shape. The shape of the support portion 745 can be variously modified only if the support portion 745 does not generate a damage to the other members while making contact with the mold frame 730.

As shown in FIG. 6, the protecting cover 770 is fixed by forming a penetrating hole in the protecting cover 770 which is opposite to the bottom surface of the mold frame 730 and forming a catching boss 550 which is engaged with the penetrating hole in the mold frame 730. It is preferable that a bonding material 520 or a bonding tape is formed in the protecting cover 770 which is opposite to the bottom surface of the mold frame 730.

After the liquid crystal display module is manufactured as above-mentioned, the liquid crystal display module is positioned in a front case 800 which has an opening which exposes the liquid crystal display panel 710 and a rear case 900 to finish the liquid crystal display device.

In the preferred embodiments, the flexible circuit board of the gate side which is manufactured by the COF method of the gate side has been explained, but the present invention can be applied to a liquid crystal display module in which a integrated printed circuit board is installed in a body and only a flexible circuit board of the COF method is attached to the data side and the gate side.

Various preferred embodiments for realizing the object of the present invention overlaps the gate side flexible circuit board 718 and a portion of the mold frame 730 to reduce the size and the weight of the liquid crystal display device 600.

As above-mentioned, an integrated printed circuit board is manufactured by integrating the circuit of the gate portion and the source portion, and then is positioned on the source side of the liquid crystal panel, and the gate side flexible circuit board 718 realized by the COF method is received in a receiving recess 760 which is formed in the mold frame 730. Thus, the weight and the volume of the liquid crystal display device 600 can be reduced.

In the above embodiments, the liquid crystal display device which has a flexible circuit board which is attached to the gate side of the liquid display panel, is shown. However, the flexible circuit board manufactured by the COF method may be provided to the source side of the liquid crystal display device. At this time, the supporting member of the present invention may also be useful for fixing the flexible circuit board towards the mold frame.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device, comprising:
    a mold frame having a receiving space and sidewalls surrounding the receiving space;
    a backlight assembly disposed on the receiving space;
    a liquid crystal display panel disposed on the backlight assembly;
    a flexible circuit board having a first portion attached to the liquid crystal display panel, and a second portion extended from the first portion;
    a receiving recess formed on an outer side surface of the sidewall and receiving the second portion of the flexible circuit board;
    a chassis coupled to said mold frame, to fix said liquid crystal display panel and said back light assembly therebetween; and
    a support member configured to fit into the receiving recess and inserted into the receiving recess to fix the second portion of the flexible circuit board therebetween.

2. The liquid crystal display device of claim 1, wherein of the receiving recess has a recessed portion having a first depth at the upper end of the outer side surface of the sidewall and a second death at the lower end thereof, the second depth greater than the first depth.

3. The liquid crystal display device of claim 1, wherein the flexible circuit board has a protruding portion formed on the second portion, and
    the receiving recess has a recess portion receiving the protruding portion.

4. The liquid crystal display device of claim 1, further comprising a resilient member installed between the flexible circuit the chassis to fix the flexible circuit board.

5. The liquid crystal display device of claim 1, further comprising an integrated printed circuit board having a source portion for providing a data driving signal to the liquid crystal display panel through a data line of the liquid crystal display panel and a gate portion for providing a gate driving signal to a gate line of the liquid crystal panel, wherein and the flexible circuit board is a gate side flexible circuit board attached to the gate side of the liquid crystal display panel to transfer the gate driving signal from the integrated printed circuit board to the liquid crystal display panel.

6. A liquid crystal display device comprising:
a liquid crystal display panel;
a flexible circuit board attached to the liquid crystal display panel;
a back light assembly for providing a light to said liquid crystal display panel;
a mold frame for receivina said liquid crystal display panel and said back light assembly, wherein the mold frame includes
a receiving recess receiving a portion of the flexible circuit board;
a chassis counled to said mold frame to fix said liquid crystal display panel and said back light assembly therebetween to said mold frame; and
a support member for supporting the portion of the flexible circuit board in the receiving recess,
wherein the support member includes a separating support member for closely supporting a bottom surface of the flexible circuit board. the separating support member is inserted into the receiving recess,
at least one engaging recess having a predetermined depth is formed at an end of the receiving recess, and
at least one engaging hole having a predetermined depth is formed in the engaging recess.

7. The liquid crystal display device of claim 6, wherein the separating support member comprises a fixing body having an inclined surface, an engaging plate formed on both sides of the fixing body and inserted into the engaging recess, and an engaging boss formed on the engaging plate and inserted into the engaging recess.

8. A liquid crystal display device, comprising:
a liquid crystal display panel;
a flexible circuit board attached to the liquid crystal display panel;
a back light assembly for providing a light to said liquid crystal display panel;
a mold frame for receiving said liquid crystal display panel and said back light assembly, wherein the mold frame includes a receiving recess receiving a portion of the flexible circuit board;
a chassis coupled to said mold frame to fix the liquid crystal display panel and said back light assembly therebetween; and
a support member supporting the portion of the flexible circuit board in the receiving recess,
wherein the support member is a fixing film having at least one end attached to an inner surface of the chassis and having another other end fixed to a bottom surface of the mold frame for supporting said flexible circuit board, and
a plurality of flexible circuit boards are attached to one side of the liquid crystal display device, and one side end which is attached to the chassis among a plurality of fixing films which correspond to the number of the flexible circuit boards is protruded as the number of the receiving recess, and the other side end which is attached to the mold frame among the fixing films is integrally connected.

9. The liquid crystal display device of claim 8, further comprising a bonding material for fixing the bottom surface of the mold frame and the end portion of the fixing film opposite to the bottom surface of the mold frame.

10. The liquid crystal display device of claim 8, wherein a boss is formed on a bottom surface of the mold frame, and a penetrating hole for fixing the fixing film is formed in a portion of the fixing film which corresponds to the boss.

11. A liquid crystal display device, comprising:
a liquid crystal display panel;
a flexible circuit board attached to the liquid crystal display panel;
a back light assembly for providing a light to said liquid crystal display panel;
a mold frame for receiving said liquid crystal display panel and said back light assembly, wherein the mold frame includes a receiving recess receiving a portion of the flexible circuit board;
a chassis counled to said mold frame to fix the liquid crystal display panel and said back light assembly therebetween; and
a support member supporting the portion of the flexible circuit board in the receiving recess,
wherein the support member is fixed to the chassis provided at a side wall portion of the chassis which corresponds to the flexible circuit board, and
the support member has an L-shape portion and a horizontal portion, the horizontal portion is attached to an inner side wall of the chassis for supporting a rear surface of the flexible circuit board.

12. The liquid crystal display device of claim 11, wherein the support member is comprised of a resilient material.

13. The liquid crystal display device of claim 11, further comprising a protecting cover having one end fixed to a side wall portion of the chassis at a position higher than the support member and which is extended to one end of a bottom surface portion of the mold frame, covering the flexible circuit board.

14. The liquid crystal display device of claim 13, further comprising a protecting cover for fixing the other end of the protecting cover to the bottom surface portion of the mold frame.

15. The liquid crystal display device of claim 11, further comprising a printed circuit board cover for protecting a bottom surface portion to which an integrated circuit board is attached and a bottom surface portion to which the flexible circuit board is attached, the printed circuit board cover being provided on a bottom surface of the mold frame.

16. The liquid crystal display device of claim 11, wherein the support member includes a bending piece which is fixed to a side wall portion of the chassis substantially corresponding to a portion where the flexible circuit board is attached and is bent to support the flexible circuit board from the side wall portion of the chassis.

17. The liquid crystal display device of claim 16, wherein the bending piece comprises a horizontal portion which is fixed to a central portion of the side wall portion of the chassis and an inclined portion which is provided at an end of the horizontal portion for supporting the flexible circuit board.

18. The liquid crystal display device of claim 17, further comprising a support portion for supporting the inclined portion formed at an end of the inclined portion and extended to the bottom surface portion of the mold frame.

19. The liquid crystal display device of claim 18, wherein the support portion has a hook shape.

* * * * *